United States Patent
Tian et al.

(10) Patent No.: US 8,364,997 B2
(45) Date of Patent: Jan. 29, 2013

(54) VIRTUAL-CPU BASED FREQUENCY AND VOLTAGE SCALING

(75) Inventors: Kun Tian, Shanghai (CN); Ke Yu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 400 days.

(21) Appl. No.: 12/644,359

(22) Filed: Dec. 22, 2009

(65) Prior Publication Data

US 2011/0154321 A1    Jun. 23, 2011

(51) Int. Cl.
  *G06F 1/00* (2006.01)
  *G06F 9/455* (2006.01)
(52) U.S. Cl. ............................... 713/322; 718/1
(58) Field of Classification Search .............. 713/322; 718/1
See application file for complete search history.

(56) References Cited

U.S. PATENT DOCUMENTS

| | | | |
|---|---|---|---|
| 2006/0047987 A1* | 3/2006 | Prabhakaran et al. ....... | 713/322 |
| 2006/0253715 A1* | 11/2006 | Ghiasi et al. .................. | 713/300 |
| 2007/0150893 A1* | 6/2007 | Grobman ........................ | 718/1 |
| 2008/0201591 A1* | 8/2008 | Hu et al. ....................... | 713/323 |
| 2008/0235364 A1* | 9/2008 | Gorbatov et al. ............. | 709/224 |
| 2009/0204830 A1* | 8/2009 | Frid et al. ...................... | 713/322 |
| 2010/0037038 A1* | 2/2010 | Bieswanger et al. ........ | 712/220 |
| 2011/0153984 A1* | 6/2011 | Wolfe et al. ................... | 712/42 |

OTHER PUBLICATIONS

Ripal Nathuji et al., "VirtualPower: Coordinated Power Management in Virtualized Enterprise Systems"; Proceedings of twenty-first ACM SIGOPS Symposium on Operating Systems Principles, Oct. 14-17, 2007, Stevenson, Washington, USA, 14 pages.

Huacai Chen et al., "ClientVisor: leverage COTS OS functionalities for power management in virtualized desktop environment"; ACM/Usenix International Conference on Virtual Execution Environments; Proceedings of the 2009 ACM SIGPLAN/SIGOPS international conference on Virtual execution environments; pp. 131-140.

* cited by examiner

*Primary Examiner* — Thomas Lee
*Assistant Examiner* — Terrell Johnson
(74) *Attorney, Agent, or Firm* — Trop, Pruner & Hu, P.C.

(57) ABSTRACT

Frequency and voltage scaling are performed for each virtual processor in a virtual environment. The characteristics of the workload performed by each virtual processor are dynamically profiled and a scaling algorithm determines a scale factor for that virtual processor as a function of the profiled characteristics. The profiled characteristics may include virtualization events associated with the workload being performed. In addition, a particular scaling algorithm and profiling technique may be selected based on which virtual processor is currently running.

20 Claims, 3 Drawing Sheets

VIRTUAL-CPU BASED FREQUENCY AND VOLTAGE SCALING

BACKGROUND

As microprocessors and computer systems advance, greater amounts of software can be executed on a single platform. To accommodate different software that may be written for different platforms and operating systems (OSs), virtualization technologies have been developed. Virtualization enables multiple OSs and applications to share the resources of and execute concurrently on a single hardware platform. Today, virtualization is finding its way into diverse types of computing environments, from small factor servers to large-scale data centers that simultaneously provide computing services to multiple customers.

Virtualization generally is implemented using a software entity referred to as a Virtual Machine Monitor (VMM). The VMM presents to each OS a virtual machine (VM) having virtual resources, including one or more virtual processors, virtual memory and virtual input/output (I/O) resources, that the OS may completely and directly control. The VMM maintains the system environment for implementing virtualization policies, such as sharing and/or allocating physical resources among the VMs. Each OS and other software that runs on a VM is referred to as a guest or guest software, while a host or host software is software, such as the VMM, that runs outside of the virtualization environment. Thus, virtualization technologies allow multiple guest software to simultaneously run on a single host or physical platform. A guest executing on a system may see a virtual central processing unit (VCPU) which appears to the guest as a physical CPU having the same, or a subset of the same, features as the actual physical CPU (PCPU).

Because virtualization technologies can consolidate many diverse workloads into a single physical machine, virtualization makes efficient use of physical resources and, thus, in some respects, may be viewed as a type of environmentally friendly (or "green") technology. This has provided momentum to embrace virtualization technologies, particularly since energy consumption is of increasing concern. However, simply consolidating OSs on a single platform may still not be enough to satisfy demands for efficiency. Towards that end, virtualization technologies are increasingly being required to further exploit fine-grained power management (or power-saving) capabilities of the type that were first introduced on client devices and now are popular even on high end servers. However, virtualization of the CPUs and the continuous sharing and re-allocating of physical resources adds a layer of complexity, making it difficult to translate traditional power management techniques implemented by an OS on a physical machine to a virtual environment.

DETAILED DESCRIPTION

Figure 1:
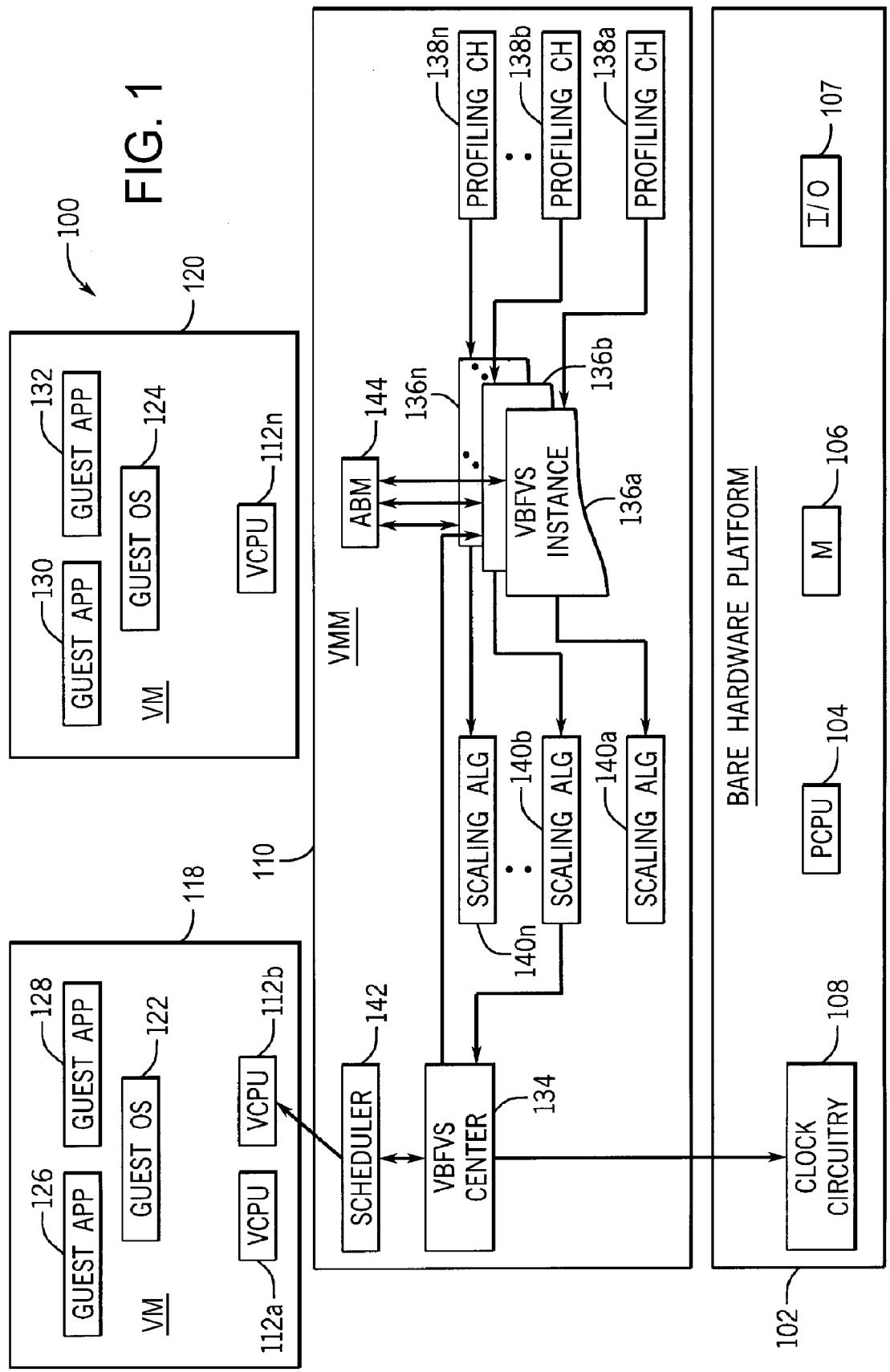
FIG. 1 is a block diagram of a system in accordance of one embodiment of the invention.

In various embodiments, power-saving capabilities, including frequency scaling and voltage scaling, may be efficiently integrated with virtualization technology. Current virtual systems either fail to provide any type of scaling capabilities (and thus do little in terms of power-saving) or simply replicate the same power-saving algorithms that are implemented by the OS in a physical machine. However, scaling algorithms that are intended for use in physical environments do not translate well to virtual environments. One example of a general scaling technique implemented in a physical machine is referred to as dynamic voltage and frequency scaling (or DVFS). Dissipated power in a chipset (e.g., a processor or CPU) is a function of the voltage and frequency applied to the static CMOS gates in that chipset. In accordance with a DVFS technique, power consumption is efficiently reduced by changing the voltage and frequency of the signals applied to the CPU based upon changing circumstances. In systems implementing a DVFS technique, scaling algorithms intelligently determine when it is appropriate to scale voltage and frequency in a manner that will have minimal impact on performance. One way to do this is to base the scaling decision on CPU utilization.

However, power-saving algorithms that are based on utilization of the physical processor (i.e., PCPU) make little sense for many of the diverse types of workloads (e.g., memory intensive workloads, latency sensitive workloads, etc.) that are implemented in virtual machines. Because virtualization provides for the consolidation of diverse workloads into a single physical machine that are executing concurrently, a scaling algorithm based on utilization of the physical processor may be slow to respond and may not be closely coupled to the workload that is currently scheduled. Moreover, simply replicating algorithms used with physical machines overlooks opportunities to make use of virtualization events which are indicative of the workload characteristics running on a virtual CPU. Such indicators are seldom seen in a real hardware implementation due to the complexity and cost of making the indicators visible. However, these indicators are readily available in a virtualization environment since the VMM must present guests with virtual resources (e.g., CPU, memory, I/O) in software.

Accordingly, in some embodiments of the invention, frequency and voltage scaling techniques are coupled to each virtual CPU rather than to the physical CPU. For instance, each virtual CPU is provisioned with its own workload profiling channel and/or its own scaling algorithm to tailor and couple the scaling to that particular VCPU. In addition, some embodiments profile workload characteristics based on continuous monitoring of virtualization events to dynamically and more intelligently react to the diverse workloads running on the various VCPUs. In such embodiments, multiple different scaling algorithms may be available for selection as a function of the actual characteristics of the currently executing workload. In this manner, frequency and voltage scaling can respond to fast-changing consolidated workload patterns with the result that power savings may be achieved without sacrificing performance.

Frequency and voltage scaling algorithms generally are based on historical information regarding the demand for and utilization of the PCPU. For instance, some OS implementations periodically sample PCPU utilization, e.g., in 20 millisecond (ms) intervals. Based on that past pattern of PCPU utilization, an appropriate clock frequency (or scaling factor) may be determined for the CPU in the next 20 ms interval. For instance, if CPU utilization is high, then a high frequency will be selected. Likewise, if utilization is low, then a low frequency may be selected. This technique generally is adequate in physical systems because the OS system schedulers typically run in short intervals (e.g., 1 ms), and thus workload patterns viewed in windows of 20 ms generally are sufficient to provide an accurate indication of an average workload pattern on a single PCPU.

VMM schedulers, however, behave differently because of the need to time-share a PCPU for VCPUs running on that PCPU. Rather than running in short intervals, a VMM scheduler relaxes its scheduling of tasks to a larger interval to avoid the high context switch overhead that generally accompanies each newly introduced virtualization layer. For instance, a VMM typically may have a scheduling interval on the order of 30 ms. Since this time quantum (e.g., 30 ms) is relatively close in size to the frequency scaling interval (e.g., 20 ms) of PCPU scaling algorithms, there is a high likelihood that a pattern of the previous scheduled-out VCPU will be used to determine the frequency scaling for the next scheduled-in VCPU. Because the scheduled-out and scheduled-in VCPUs may be running vastly different types of workloads, the frequency selected for the scheduled-in VCPU may be poorly suited for the work currently being performed. This problem is one type of problem that is referred to as "false scaling." One way to avoid the false scaling problem in this instance would be to simply enlarge the scaling interval (e.g., to 200 ms or more). However, a large scaling interval in turn may result in a scaling algorithm that cannot timely respond to fast-changing characteristics of ongoing workloads and may also cause fairness issues with sharing resources. Accordingly, embodiments of the invention avoid the false-scaling problem by provisioning each VCPU with its own profiling channel, thus allowing the characteristics of each VCPU to be individually monitored and analyzed. Thus, scaling decisions can be based on the characteristics of the workload that is actually executing on the VCPU.

As mentioned above, scaling decisions typically may be a function of CPU utilization. However, CPU utilization is not always an accurate indicator for the optimal frequency for the particular workload, which can also result in a false-scaling situation. For instance, a memory intensive workload may saturate the CPU, but may also have many stall cycles. Thus, although CPU utilization would indicate that a high frequency should be selected, a low frequency actually could be selected without detrimentally affecting performance. Accordingly, some embodiments of the invention address this type of false-scaling problem by adapting the workload characteristic profiling channel to recognize workload patterns that are not based on CPU utilization.

In some embodiments, VCPU-based scaling also may offer further advantages by using different scaling algorithms for each VCPU. Yet further, multiple scaling algorithms may be available for use by any one VCPU. For instance, one scaling algorithm may be suitable for selecting a frequency based on CPU utilization, another scaling algorithm may be configured to select a frequency based on performance considerations, yet another scaling algorithm may base its decisions on power savings, etc. In such embodiments, a particular scaling algorithm may be dynamically selected based on characteristics of the current workload that are provided by the profiling channel. A currently selected scaling algorithm may then be replaced with another scaling algorithm when and if the characteristics of the current workload changes. For instance, as will be explained in further detail below, I/O intensive workloads, memory intensive workloads, and latency sensitive workloads may all benefit from the use of different scaling algorithms that take into consideration the realities of the characteristics of those workloads.

In addition to providing improved scaling capabilities that are tailored for each VCPU, VCPU-based scaling also provides opportunities for more accurately determining compliance with service level agreements between the provider of the computing services and its customers. For instance, such agreements may have certain provisions that are based on utilization and speed of the physical processing resources. Thus, the frequency at which each VCPU is running is a factor which may be taken into consideration for the service level agreement requirements. If PCPU-based scaling were used, it might not be possible to accurately ensure compliance with a frequency requirement. Thus, a PCPU-based scaling algorithm may have to be disabled as long as any VCPU that is subject to such a requirement is running on a PCPU. VCPU-based scaling can thus facilitate metering and accounting for utilization of the system's processing resources for each customer's workload in a more accurate manner.

FIG. 1 illustrates an exemplary framework 100 for implementing VCPU-based scaling in a virtual environment in accordance with one embodiment of the invention. Although FIG. 1 shows an embodiment of a virtualization framework 100, it should be understood that embodiments may also be implemented in other frameworks, architectures, systems, platforms or environments depending on the particular application in which the virtualization techniques are employed As shown in FIG. 1, a virtualization framework 100 includes a bare hardware platform 102 that may correspond to any type of computer system that can execute OS or VMM software. For example, bare hardware platform may be that of a personal computer, mainframe computer, portable computer, handheld computer, set-top box, server, or any other computing system. As shown in FIG. 1, the bare hardware platform 102 includes a physical processor (or PCPU) 104, a memory 106, I/O resources 107, and clock generation/scaling circuitry 108 for generating a clock signal having a frequency and a voltage for use by the various components of the platform 102, such as the PCPU 104.

PCPU 104 may be any type of processor, including a general-purpose microprocessor, such as a multi-core processor, microcontroller, or programmable logic. Although FIG. 1 shows only one PCPU 104, it should be understood that bare hardware platform 102 may include multiple processors, including any number of multi-core processors, each with any number of execution cores, and any number of multithreaded processors, each with any number of threads.

The memory 106 shown in FIG. 1 may include dynamic random access memory (DRAM) or other types of memory, such as static random access memory. Bare platform hardware 102 may also include any number of additional devices or connections, including various storage devices for storing data, applications, instructions of software, etc.

In addition to the bare hardware platform 102, the system 100 in FIG. 1 includes a VMM 110, and VMs 118 and 120 having VCPUs 112a, 112b, 112n, guests OSs 122 and 124 and guest applications 126, 128, 130 and 134. As shown, guest OS 122 and guest applications 126 and 128 are installed in VM 118 for execution by VCPUs 112a and 112b. Guest OS 124 and guest application 130 and 132 are installed in VM 120 for execution by VCPU 112n. It should be understood, however, that the system 100 may include any number of VMs, guests, and VCPUs, that the VMs may include other virtual resources (e.g., virtual memory, virtual I/O resources, etc.), and that the scope of the invention is not limited in this regard.

VMM 110 may be any software, firmware or hardware host installed on or accessible to bare platform hardware 102 to present VMs, i.e., abstractions of bare platform hardware 102, to guests or to otherwise create and manage VMs and implement virtualization policies. In other embodiments, a host may be any VMM, hypervisor, OS, or other software, firmware, or hardware capable of controlling bare platform hardware 102. A guest may be any OS, any VMM, including another instance of VMM 110, any hypervisor, or any application or other software.

Referring still to FIG. 1, the VMM 110 includes a virtual based frequency and voltage scaling (VBFVS) center 134 and a plurality of VBFVS instances 136a-n. Each VBFVS instance 136a-n is allocated to a VCPU 112a-n. Each VBFVS instance 136a-n also is bound to a profiling channel 138a-n that profiles the characteristics of the VCPU's workload and to a scaling algorithm 140a-n that determines a suitable scaled frequency and/or voltage (or scaling factor) as a function of the profile provided by the profiling channel. In some embodiments, the binding to a particular scaling algorithm 140 may be dynamically performed. For instance, profiling data may indicate that a scaling algorithm 140b may be better suited for the workload currently running on the VCPU than the currently bound algorithm 140a. In such a case, the VBFVS instance 136 may dynamically switch from the algorithm 140a to the scaling algorithm 140b.

Referring again to FIG. 1, system 100 also includes a VMM scheduler 142 for scheduling each of the VCPUs 112a-n. When the scheduler 142 schedules in a new VCPU (e.g., VCPU 112b), the scheduler 142 sends a context switch event to the VBFVS center 134. When the VBFVS 134 center accepts the context switch event, the VBFVS center 134 selects the VBFVS instance (e.g., instance 136b) to allocate to the scheduled-in VCPU 112b. The profiling channel (e.g., channel 138b) associated with the VBFVS instance 136b is initiated and provides information to the scaling algorithm (e.g., algorithm 140b) bound to the instance 136b to determine an appropriately scaled frequency and/or voltage. The VBFVS center 134 then scales the frequency by communicating an indication of the new frequency to the clock generation circuitry 108 that generates the clock signal for the PCPU 104. In some embodiments, the scaling is performed repeatedly during the entire period during which the VCPU 112b is scheduled in.

In one embodiment, each VBFVS instance 136 also is associated with an Accounting and Budgeting Module (ABM) 144 to provide for fine-grained accounting of power and energy at the VCPU level.

Figure 2:
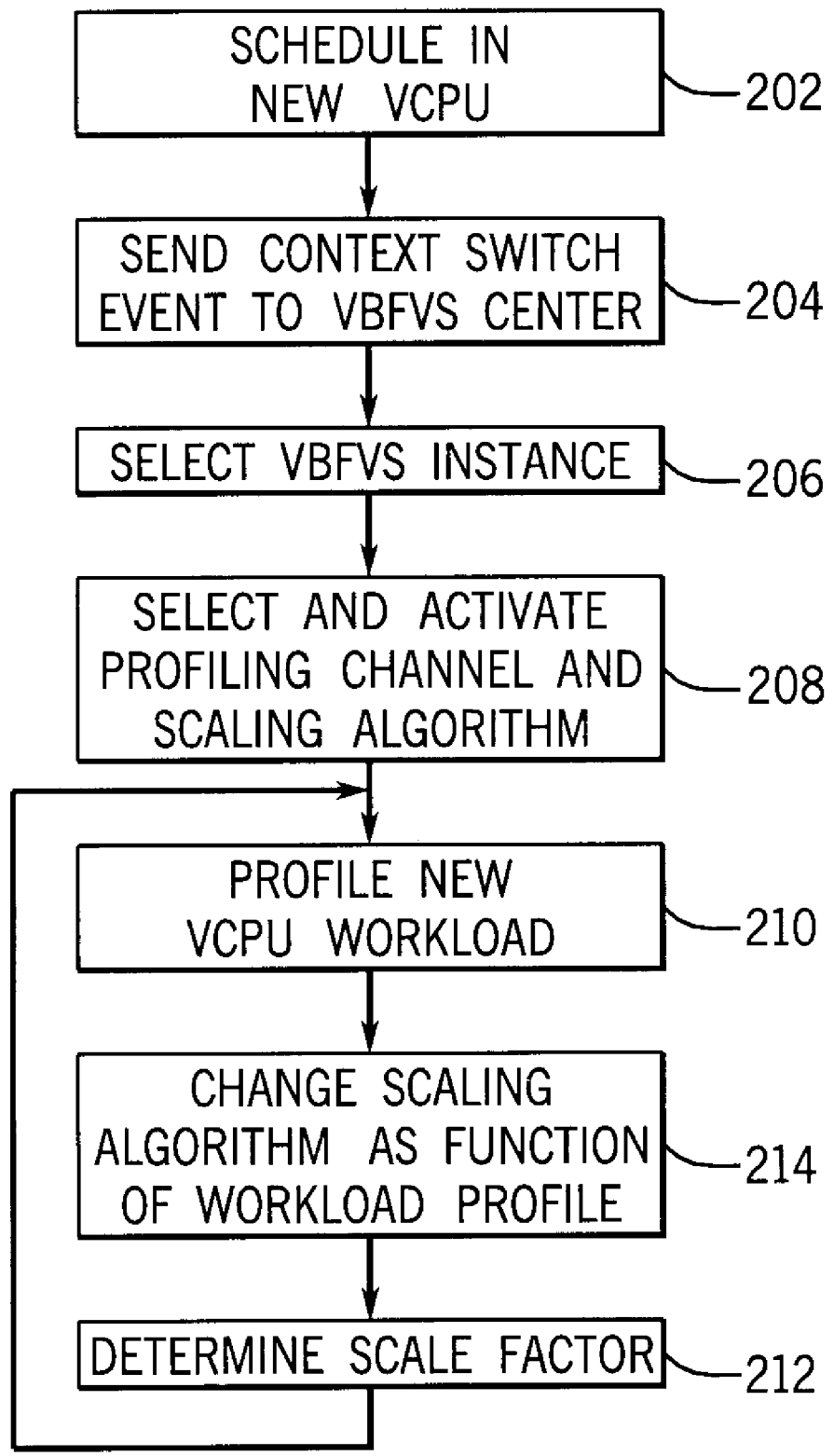
FIG. 2 is a flow diagram of a method in accordance with one embodiment of the invention.

FIG. 2 shows an exemplary flow diagram for determining frequency and/or voltage scaling that may be implemented in the system 100. It should be understood that the invention is not limited to the particular steps or the particular order of steps shown. Other embodiments may include more or fewer steps and may alter the order in which the steps are performed.

In FIG. 2, at block 202, the VMM scheduler 142 schedules in a new VCPU (e.g., VCPU 112b). At block 204, the VMM scheduler 142 sends a context switch event to the VBFVS center 134. The VBFVS center 134 then selects the VBFVS instance 136 for the scheduled-in VCPU 112 (block 206). In some embodiments, the VBFVS center 134 may also send scaling statistics to the scheduler 142. For instance, the VBFVS center 134 may store which profiling channel and scaling algorithm was last used with the scheduled-out VCPU and may update statistics regarding the workload characteristics and VCPU usage. The VBFVS center 134 may also record the last frequency that had been determined for use by the scheduled-out VCPU. The VBFVS center 134 also may send the statistics to the scheduler 142. Yet further, the VBFVS center 134 may recover the previously recorded last frequency for the scheduled-in VCPU 112 and thaw the profiling mechanism and scaling algorithm that had last been used with the current scheduled-in VCPU 112. In other embodiments, the VBFVS center 134 may use other techniques for determining which frequency, profiling mechanism and scaling algorithm to initially employ with a scheduled-in VCPU, such as using default starting parameters.

Regardless of the manner in which the profiling mechanism, scaling algorithm and frequency/voltage are initially selected for the scheduled-in VCPU, the selected profiling channel 138 is activated and begins collecting data to profile the characteristics of the currently executing workload on the scheduled-in VCPU 112 (blocks 208 and 210). The profiled information is then provided to the selected scaling algorithm 140. At block 212, the algorithm 140 determines the appropriate frequency/voltage (or scaling factor) and communicates it to the VBFVS center 134. The VBFVS center 134 then causes the clock generation circuitry 108 to scale the clock frequency/voltage accordingly. The profiling channel 138 continues to collect and send data to the scaling algorithm 140, and the scaling algorithm 140 continues to scale the frequency and/or voltage in response to the data until a new VCPU is scheduled in.

As mentioned previously, various types of scaling algorithms may be employed and, in fact, multiple different types of scaling algorithms may be available for selection for a current scheduled-in VCPU. Thus, in some embodiments, the scaling technique shown in FIG. 2 also includes a step of changing or selecting a new scaling algorithm 140 based on the profiled workload (block 214). For instance, in one exemplary embodiment of the invention, one type of scaling algorithm that may be available for selection is a CPU-demand-based scaling (CPU-DBS) algorithm. Generally, utilization of a physical CPU may be calculated by:

$$(T_{elapsed} - T_{idle})/T_{elapsed} \qquad \text{(Eq. 1)}$$

where $T_{elapsed}$ is the elapsed time since utilization was last sampled, and $T_{idle}$ is the CPU idle time during the elapsed phase.

For the VCPU-based scaling framework, this demand-based formula may be modified such that it is closely coupled to the VCPU and, as a result, reduces occurrences of false-scaling. For instance, several new factors may be introduced into the profiling channel 138 that take the virtual environment into consideration. As an example, in virtual machines, the VMM scheduler 142 generally allocates some time quantum (e.g., 30 ms) for each scheduled-in VCPU 112. However, there are several situations where a scheduled-in VCPU 112 may not consume all of its granted quantum in one time slice. One such situation occurs when the VCPU 112 itself stops running because it enters an idle state. In this situation, the VMM scheduler 142 may place the VCPU 112 in a blocked state until a virtualization event occurs to wake the VCPU 112 up. For purposes of determining VCPU utilization, the time during which the VCPU 112 remains in the blocked state may be referred to as $T_{blocked}$. Thus, the scheduler 142 may be adapted to communicate the granted quantum and the blocked time parameter to the profiling channel 138 for use in profiling the characteristics of the workload.

Another situation in which the VCPU 112 may not consume its entire quantum in a single time slice may occur when the VCPU 112 is preempted by other higher priority VCPUs 112. Here, the preempted VCPU 112 is still runnable but is pending in a run queue and actually has some meaningful jobs ongoing. Again, for purposes of determining VCPU 112 utilization, this preempted time may be referred to as $T_{stolen}$. Again, the scheduler 142 may be adapted to communication the stolen time parameter to the profiling channel 138.

Given these new factors, the profiling channel 138 may calculate VCPU 112 utilization as follows:

$$(T_{quantum} - T_{stolen} - T_{blocked})/(T_{quantum} - T_{stolen}) \qquad \text{(Eq. 2)}$$

By using Equation (2) to determine VCPU 112 utilization, known demand frequency scaling algorithms for native OS environments may be used with the difference being that VCPU 112 utilization (instead of PCPU 104 utilization) is provided as the input to the DBS-based algorithm 140. Taking VCPU utilization as an input, the CPU-DBS algorithm outputs a lower frequency for low utilization and vice versa.

There are situations, however, where the CPU-DBS algorithm does not provide an optimal balance between performance and power saving. In some instances, better balance may be achieved by profiling additional or different information (other than VCPU 112 utilization) regarding the characteristics of the current workload. In the virtual environment, many hints are generated during virtualization from which workload characteristics may be deduced. More particularly, to consolidate multiple VMs on a single physical machine, the VMM needs to intercept various types of sensitive actions from each VM, emulate the desired behavior, and inject asynchronous virtual interrupts. This new virtualization layer adds overhead to the virtual machine as compared to running on the bare hardware platform. However, the rich hints provided by this inevitable overhead may be used to aid the conjecture of workload characteristics.

As an example, a workload having input/output (I/O) intensive characteristics may be readily discerned based upon the frequency of I/O requests on the emulated I/O device. If the I/O device is para-virtualized at the driver level, then an enlightened driver could proactively provide statistics that are indicative of the I/O intensive workload. As another example, memory virtualization events may be indicators of a memory intensive workload. For instance, the VMM typically may maintain a shadow-page table which is generated from and synchronized to a guest page table once the latter is changed, because the guest page table contains virtual memory addresses which cannot be directly understood by the PCPU. The VMM may mark guest page tables as read-only. Then, when a guest attempts to modify its current page table, a page fault will occur for the VMM to synchronize with. If a VCPU allocates and frees memories frequently, this type of workload may be discerned from statistics indicative of such page faults. Latency sensitive workloads may also be readily discerned. Typically, a latency sensitive pattern is characterized by multiple timers and interrupts. Since the sources of the timers and interrupts are virtualized by the VMM, the VMM can track those events to discern a latency sensitive workload.

It should be understood that the virtualization events discussed above are exemplary only and that other types and combinations of events or indicators may be used to profile and deduce characteristics of a workload and, thus, to select an appropriate scaling algorithm. Moreover, the manner in which workload characteristics may be profiled and deduced may vary depending on the particular implementation of the VMM, the features of the underlying hardware virtualization features, etc. Regardless of the particular manner in which workload characteristics are discerned, embodiments of the invention may import those characteristics into the VCPU-based scaling framework shown in FIG. 1. Using these workload characteristics, a particular scaling algorithm may be selected for binding to the VCPU instance allocated to the VCPU running that workload.

The following examples illustrate the benefits that may be attained by having multiple types of scaling algorithms available for selection based on workload characteristics. As a first example, a memory intensive workload typically has many stall cycles. As such, such a workload could run with a lower frequency clock without losing performance, while at the same time, the lower frequency operation could result in power savings. In such a situation, the CPU-DBS algorithm is not a good candidate since the VCPU may be fully saturated under the memory intensive workload and the CPU-DBS algorithm would compute a high frequency. Instead, a power savings-based scaling algorithm could be selected based on the recognition that a memory intensive workload can run at a lower frequency. Thus, if data collected by the profiling channel hints at a memory intensive workload, then the power savings algorithm may be selected such that a lower frequency operation may result.

As another example, a latency sensitive workload may have low VCPU utilization. Thus, the CPU-DBS algorithm would result in selection of a low frequency. However, when a VCPU is running a latency sensitive workload, it must be able to respond quickly to an incoming event. Since a low frequency would increase latency, the CPU-DBS algorithm would not be appropriate. Instead, a performance-based scaling algorithm could be selected that would ensure high frequency operation when a latency sensitive workload is deduced from the profiled indicators.

A CPU-DBS algorithm may still have many applications. For instance, if few virtualization events are detected, then VCPU utilization may be an appropriate indicator to scale frequency.

Figure 3:
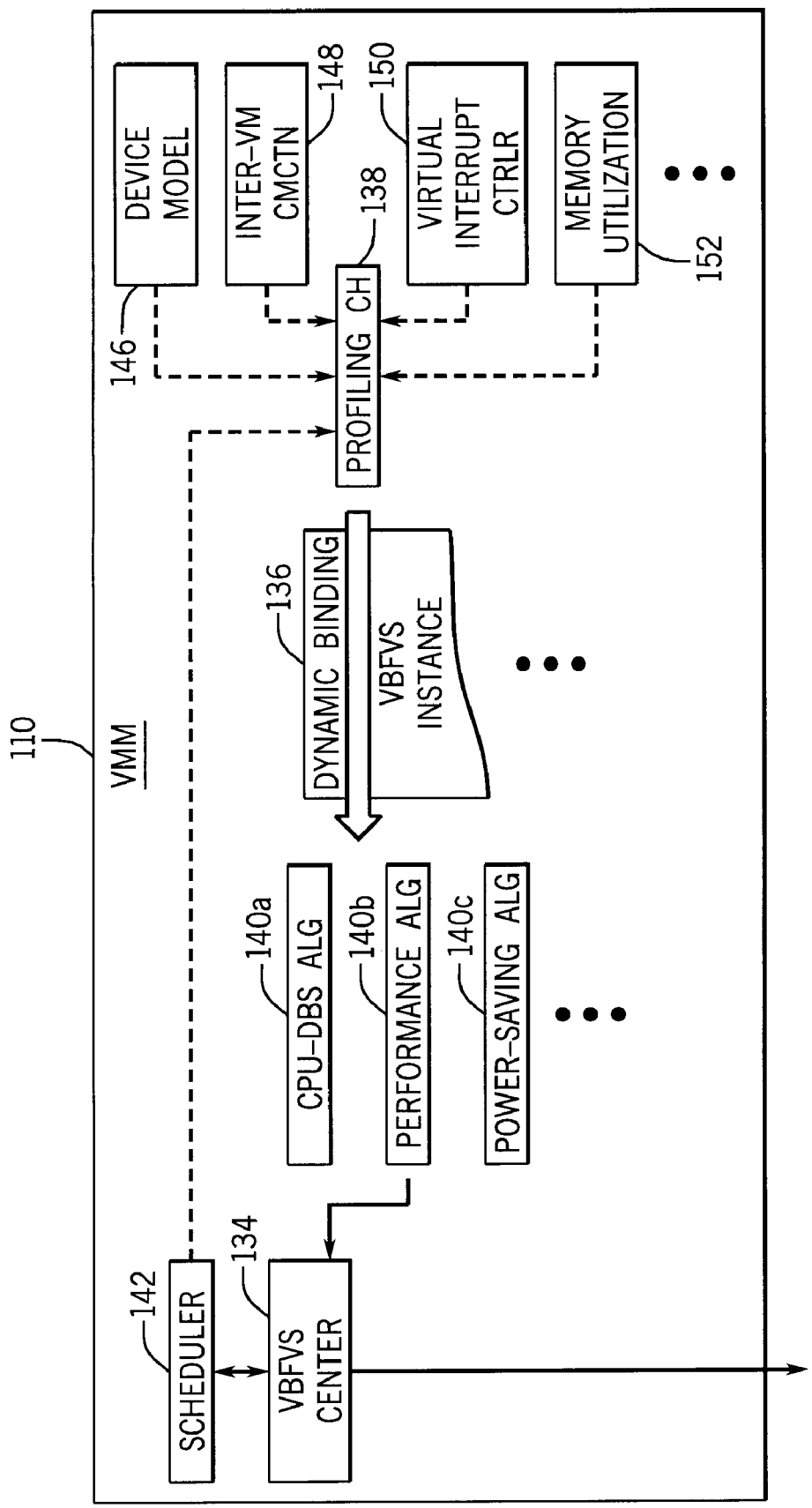
FIG. 3 is a block diagram of an exemplary virtual machine monitor in accordance with one embodiment of the invention.

Thus, as shown in the exemplary embodiment of FIG. 3, the profiling channel 138 for each VBFVS instance 136 profiles virtualization events by collecting information from various virtualization event sources, such as a model of a virtual device 146, communications between virtual machines 148, a virtual interrupt controller 150, memory-related virtualization event sources 152, etc. In addition, the profiling channel 138 receives information from the scheduler 142 regarding VCPU utilization, including the VCPU's allocated quantum, stolen time, blocked time, etc. The information from these various sources is continuously analyzed during the quantum in which the VCPU 112 is the scheduled-in VCPU so that the VFBVS instance 136 can dynamically bind itself to a particular scaling algorithm 140*a-c* based on the workload characteristic patterns that are discerned from the information. As shown in FIG. 3, available scaling algorithms may include a CPU-DBS algorithm 140*a*, a power-savings algorithm 140*b*, and a performance-based algorithm 140*c*, among many others.

VCPU-based scaling is not limited to the particular embodiments described herein. For instance, in one embodiment of the invention, VCPU-based scaling may be implemented by simply using VCPU frequency change requests as the profiling information, and either selecting a pass-through scaling algorithm to pass the request through to the VBFVS center or routing the request directly to the VBFVS center.

Embodiments may be implemented in software code (including the VMM 110 and any of its components) and may be stored on a storage medium having stored thereon instructions which can be used to program a system to perform the instructions. The storage medium may include, but is not limited to, any type of disk including floppy disks, optical disks, solid state drives, compact disk read-only memories, compact disk rewritables, and magneto-optical disks, semiconductor devices such as read-only memories, random access memories, such as dynamic random access memories, static random access memories, erasable programmable read-only memories, flash memories, electrically erasable programmable read-only memories, magnetic or optical cards, or any other type of media suitable for storing electronic instructions. Instructions of the software may be loaded for execution on a processor (such as the PCPU 104 in FIG. 1).

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method, comprising:
profiling characteristics of a workload performed by each of a plurality of virtual processing devices in a corresponding one of a plurality of workload profiling channels associated with an instance allocated to the corresponding virtual processing device;
providing the profiled characteristics to a scaling algorithm bound to the corresponding instance; and
determining, via the bound scaling algorithm, a clock frequency for each virtual processing device as a function of its respective profiled characteristics.

2. The method as recited in claim 1, further comprising selecting the scaling algorithm to determine the clock frequency for a virtual processing device, wherein the selection is based on the profiled characteristics of the workload for that virtual processing device.

3. The method as recited in claim 1, wherein the profiling is performed continuously during a time interval during which a virtual processing device is performing its workload.

4. The method as recited in claim 2, wherein the selection of the scaling algorithm is performed dynamically during a time interval during which a virtual processing device is performing its workload.

5. The method as recited in claim 4, wherein the selection of the scaling algorithm is based on virtualization events associated with the workload performed by the virtual processing device.

6. The method as recited in claim 1, wherein the profiling is based on virtualization events associated with the virtual processing device.

7. The method as recited in claim 6, wherein the profiling is performed dynamically.

8. The method as recited in claim 1, wherein the profiling is based on utilization of the virtual processing device.

9. A system comprising:
a processor resource; and
a virtual machine monitor to manage virtualization of the processor resource into a plurality of virtual processors, the virtual machine monitor further to allocate time intervals to the virtual processors to perform respective workloads, the virtual machine monitor further to profile characteristics of the workloads performed during the corresponding time intervals in a corresponding one of a plurality of workload profiling channels associated with an instance allocated to the corresponding virtual processor, and provide the profiled characteristics to a scaling algorithm bound to the corresponding instance and to determine, via the bound scaling algorithm, a clock frequency for each of the virtual processors based on the profiled characteristics.

10. The system as recited in claim 9, wherein the virtual machine monitor is to profile the characteristics of the workload continuously during the time interval in which the corresponding virtual processor is performing the workload.

11. The system as recited in claim 10, wherein the characteristics of the workload include virtualization events.

12. The system as recited in claim 11, wherein the characteristics of the workload include utilization of the virtual processor.

13. The system as recited in claim 9, wherein the virtual machine monitor further to select a scaling algorithm to determine the clock frequency, wherein the virtual machine monitor to select the scaling algorithm as a function of the profiled characteristics.

14. The system as recited in claim 13, wherein the virtual machine monitor is to select a scaling algorithm as a function of the profiled characteristics.

15. The system as recited in claim 14, wherein the virtual machine monitor is to dynamically select a scaling algorithm during the time interval in which the corresponding virtual processor is performing the workload.

16. A non-transitory computer readable medium having stored thereon instructions which, when executed by a processing device, cause the processing device to:
profile characteristics of a workload performed by each of a plurality of virtual processing devices in a corresponding one of a plurality of workload profiling channels associated with an instance allocated to the corresponding virtual processing device; providing the profiled characteristics to a scaling algorithm bound to the corresponding instance; and
determine, via the bound scaling algorithm, a clock frequency for each virtual processing device as a function of its respective profiled characteristics.

17. The medium as recited in claim 16, the instructions further to cause the processing device to select the scaling algorithm to determine the clock frequency for a virtual processing device, wherein the selection is based on the profiled characteristics of the workload for that virtual processing device.

18. The medium as recited in claim 16, wherein the processing device is to profile the characteristics continuously during a time interval during which a virtual processing device is performing its workload.

19. The medium as recited in claim 18, wherein the profile is based on virtualization events associated with the workload performed by the virtual processing device.

20. The medium as recited in claim 19, wherein the instructions cause the processing device to dynamically profile the virtualization events during the time interval.

* * * * *